United States Patent Office 3,518,544
Patented June 30, 1970

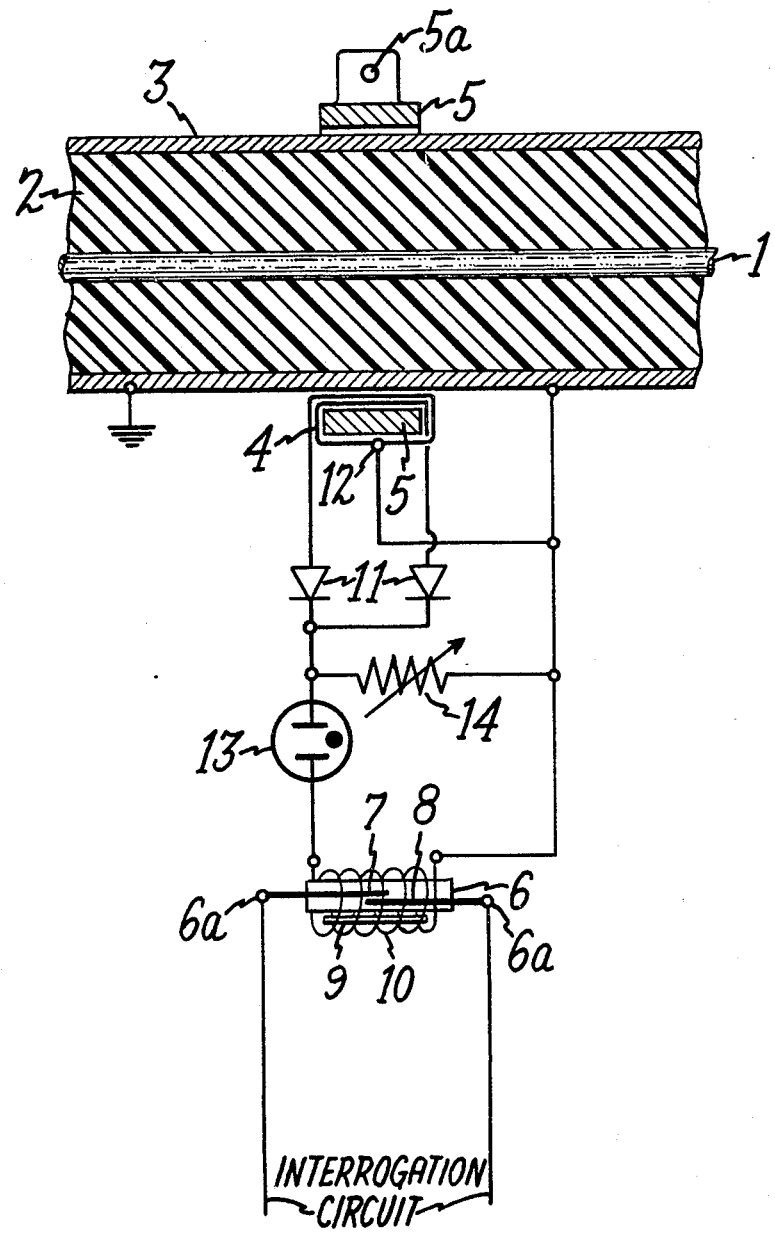

3,518,544
FAULT DETECTION CIRCUIT FOR SHIELDED CABLE TERMINATIONS
Henry N. Tachick, Pittsfield, Mass., assignor to General Electric Company, a corporation of New York
Filed Dec. 5, 1967, Ser. No. 688,035
Int. Cl. G01r 19/16
U.S. Cl. 324—127                                    7 Claims

ABSTRACT OF THE DISCLOSURE

A monitoring circuit for detecting a fault current of predetermined magnitude in an insulated electric power distrubution conductor characterized by including a voltage responsive electric breakdown device electrically connected with current indicating means and operable to pass current to the indicating means only when the predetermined magnitude of current in the insulated conductor is reached or exceeded.

---

Underground electric power transmission and distribution systems conventionally include a plurality of distribution transformers installed in vaults at spaced points throughout the system. Buried power cable conductors interconnect the respective vaults and connections are made between respective lengths of cable and between the ends of such cable and distribution transformer terminals by detachable plug-and-socket connectors called terminations. On high voltage underground systems, such terminations are designed to grade the electrical stresses formed between the power transmitting conductor and its surrounding ground potential sheath in the connection area where insulation must be stripped from the conductor to effect the interconnection.

It has been recognized that in such underground power transmission systems it is desirable to provide fault current monitoring means on given terminations throughout the system so that faults can be located relatively easily and isolated to a given vault or underground section of cable. Accordingly, fault current monitoring devices have been developed to perform this desired function. However, prior art fault monitoring devices have often given erroneous indication of fault current or have failed to indicate a fault current when one has occurred. A high proportion of such inaccuracies is attributable to one of the following causes: First, since the monitoring circuits for underground terminations are often buried in underground vaults, they are subject to extreme variations in temperature during operating conditions and such variations frequently cause preset circuit parameters, such as current magnitude sensing means, to vary during the course of operations. Second, presently known monitoring circuits detect normal high transmission currents in the same manner that they detect fault currents; thus, normal line currents of high magnitude bias the monitoring means toward an indication of fault current, so when other forces such as undue vibration, affect the circuit it may indicate the presence of a fault current when no such current magnitude exists.

It is a primary object of my invention to overcome the foregoing problems by providing a fault monitoring circuit for an underground power transmission system which reliably indicates the occurrence of a fault current with a high degree of accuracy.

Another object of the invention is to provide a fault monitoring circuit for a power system that will not be biased in its operation by normal line currents in the system.

A further object of the invention is to provide a fault indicating means for an insulated power conductor termination which will not be affected in its operation by mechanical vibration of the termination or by changes in ambient conditions.

Other objects, features and advantages of the invention will become apparent from the subsequent description taken in conjunction with the accompanying drawing, in which:

The single drawing is a diagrammatic illustration of a circuit embodying the invention, shown in respect to an insulated power conductor termination.

Referring now to the drawing, it will be seen that a preferred embodiment of the monitoring circuit of my invention is illustrated with respect to a power conductor 1 that is sheathed in insulating material 2 which in turn is encased in a grounded shield or sheath 3. The conductor 1, insulating material 2 and shield 3 may be formed of any conventional materials employed for such components in present day underground power distribution systems.

In order to provide current for actuating a fault monitoring circuit that incorporates my invention, grounded shield 3 is completely encircled by a metallic band 5 of magnetic material that may be fastened in position around the outer surface of shield 3 in any suitable manner such as by providing a screw (not shown) rotatably mounted on one end of band 5 and engageable with the threaded bore 5a fastened to the other end of band 5 so that the two ends of band 5 can be drawn together and retained in such a position by tightening the screw in bore 5a. The band 5 acts as a magnetic core or flux collector for a coil 4 so that the magnitude of current induced in the coil 4 is always proportional to the magnitude of current in the power conductor 1. Rather than illustrating a specific means for indicating a fault condition in conductor 1, the drawing has been simplified by depicting, instead, a reed switch 6 which is electrically connected to output terminals 6a that may be contacted by a conventional interrogation circuit or electrically connected to any suitable indicating means for ascertaining the position of the reed switch 6. For example, in the illustrated embodiment, contacts 7 and 8 of reed switch 6 are normally open, thus an indicating circuit ascertaining this condition would indicate a no-fault condition on conductor 1. On the other hand, if terminals 7 and 8 are closed, this would signal to such an indicating circuit that a fault current was flowing in the conductor 1, or that such a current had flowed in conductor 1 sometime subsequent to the last time that reed switch 6 was reset.

Switch 6 must be reset after it has been energized because it incorporates a latching permanent magnet 9 positioned adjacent terminals 7 and 8 to maintain the terminals 7 and 8 in closed position once they have been driven to that position by the magnetic field created by current flowing through actuating coil 10. The terminals 7 and 8 can be reset to their normally open position by applying a reverse current through coil 10 from any conventional source, such as a storage battery (not shown).

Since power distributing systems normally operate on alternating current, the current flowing in conductor 1 induces an alternating voltage in coil 4; therefore, in order to reliably actuate the operating coil 10 of reed switch 6 during either half cycle of current, it is necessary to rectify the induced alternating current voltage to a direct current voltage. For this purpose, a bi-phase rectifier 11 is connected across the winding 4, and the winding 4 has a mid-tap 12 that is connected to one end of coil 10 and also to ground by connection to shield 3. The other end of coil 10 is connected through a voltage responsive switching device, such as glow discharge lamp 13 or a Zener diode (not shown), to the output of rectifier 11. A variable resistor 14 is also electrically connected across the output of rectifier 11 to regulate the voltage level at which lamp 13 is turned on, or rendered conductive.

It will be understood that the circuit components illustrated in the preferred embodiment of my invention may be of any conventional design, since it is the novel arrangement of these elements that constitutes the essence of the invention rather than their particular characteristics. However, for proper operation of the monitoring circuit, glow discharge lamp 13 must be selected to have a relatively high breakdown voltage so that it will only conduct current to energize reed switch 6 when that voltage is attained. In addition, the circuit is conceived so that when the lamp 13 conducts, the magnitude of current that will flow through coil 10 of reed switch 6 is considerably greater that that necessary to close the terminals 7 and 8 of the switch 6. Thus, the precise turn on voltage of lamp 13 determines when reed switch 6 will be actuated and then positively actuates it to a closed position. Accordingly, minor changes in the operating point of reed switch 6 due to temperature variations or other ambient conditions will not have any affect on the monitoring circuit's ability to reliably detect a fault current. It will be understood that in order for the monitoring circuit to detect a predetermined magnitude of fault current in conductor 1, variable resistor 14 must be adjusted so that the voltage drop developed across resistor 14 by current flowing through it when glow discharge lamp 13 is not conducting will just equal the breakdown voltage of the lamp when the predetermined magnitude of fault current is reached. It will also be seen that when the voltage of the induced current from rectifier 11 appearing at lamp 13 is below the breakdown voltage of lamp 13, all current flow through coil 10 of reed switch 6 is blocked by the essentially open-circuit condition of lamp 13. Thus, even though a substantial current may be induced in coil 4 by a high magnitude of normal line current in conductor 1, the monitoring circuit does not tend to bias the reed switch 6 toward its closed position. Accordingly it is much less likely to be accidentally closed due to vibrations or other extraneous forces that the system may be subjected to. A further advantage of providing a current blocking means, such as the voltage responsive discharge lamp 13, to completely remove biasing currents from the coil 10 of reed switch 6 when a fault current is not present in conductor 1, stems from the fact that only a very small reverse current need be passed through coil 10 to reset the switch 6 to its normally open position. This is so because with lamp 13 terminating the flow of current to coil 10 when the magnitude of current in conductor 1 returns to normal, only the field of permanent latching magnet 9 retains the terminals 7 and 8 in their closed position. Therefore, a reverse flow of resetting current through coil 10 need not buck a biasing current from conductor 1, but rather constitutes the sole voltage across the coil 10.

While I have shown and described a particular embodiment of my invention, it will be obvious to those skilled in the art that changes and modifications may be made without departing from the invention and, therefore, it is intended that all such changes and modifications fall within the true spirit and scope of the invention.

What I claim as new and desire to secure by Letters Patent of the United States is:

1. A device for detecting an electric current of predetermined magnitude in an insulated conductor comprising current indicating means responsive to passage of current therethrough for indicating such current, current switching means adapted to be conductive at a predetermined voltage to pass current therethrough while blocking current when not subjected to said predetermined voltage, means for generating an output current proportional to the magnitude of current in an insulated conductor, means for electrically connecting said generating means to said indicating means through the switching means whereby said indicating means is rendered operative to indicate the presence of current in said insulated conductor only when said predetermined voltage is applied to said switching means, and means for applying said predetermined voltage to the switching means in response to at least said predetermined magnitude of current in said insulated conductor, said means for generating an output current comprising a current transformer adapted to be electromagnetically energized by a magnetic field developed by current in said insulated conductor, and current rectifying means electrically connected across an output winding of said transformer to rectify said output current.

2. A detecting device as defined in claim 1 wherein said switching means comprises a glow discharge lamp electrically connected in series with said indicating means across the output of said current rectifying means, and including a variable resistor electrically connected in parallel with said lamp and indicating means.

3. A device for detecting fault current in an insulated conductor comprising in combination, current transforming means for deriving by electromagnetic induction an output current proportional to the current in said conductor, a fault current indicator operable by said output current to indicate the passage of fault current through said conductor, current switching means electrically connected in series between said transforming means and said indicator and operable to pass said output current to said indicator only when a predetermined magnitude of voltage is impressed on said switching means, circuit means for developing said predetermined magnitude of voltage responsive to a fault current in said conductor, and means for electrically connecting said circuit means to said switching means.

4. A device as defined in claim 3 wherein said circuit means for developing said predetermined magnitude of voltage comprises a resistor electrically connected in parallel across the output of said transformer to provide means for regulating the voltage applied to said switching means.

5. A device as defined in claim 4 wherein said switching means comprises a glow discharge lamp, and said fault indicator comprises an electromagnetically actuatable reed switch.

6. In a termination structure for a coaxial high voltage underground electric conductor, a high voltage conductor for transmitting current, an insulating sheath surrounding said conductor, a grounding shield surrounding said insulating sheath, a metallic band surrounding a portion of said shield, a current transformer secondary winding wound on said metallic band whereby said band acts as a magnetic core for said winding, a current rectifier operatively connected to said winding to convert the alternating current therefrom to a direct current, a magnetic reed switch having normally open contacts and an actuating coil for closing said contacts, said actuating coil being electrically connected to be energized by said direct current, a glow discharge lamp connected in series between said actuating coil and said rectifier, said lamp being operable to conduct current to said coil thereby actuating the coil to close said contacts only when such current has at least a predetermined magnitude, and means for ascertaining when said reed switch contacts are closed.

7. In a termination structure as defined in claim 6, a variable resistor electrically connected across the output of said rectifier to regulate the output voltage of the rectifier such that said glow discharge lamp conducts only when said predetermined magnitude of current is attained.

References Cited

UNITED STATES PATENTS

| | | | |
|---|---|---|---|
| 2,362,372 | 11/1944 | Halfmann | 324—127 XR |
| 2,134,052 | 5/1964 | Cronier et al. | 307—130 XR |
| 3,205,422 | 9/1965 | Gold | 307—318 XR |
| 3,215,997 | 11/1965 | Leavitt et al. | |
| 3,239,723 | 3/1966 | Washington et al. | 307—130 XR |

ALFRED E. SMITH, Primary Examiner

U.S. Cl. X.R.

324—133; 340—253